Figure 1:
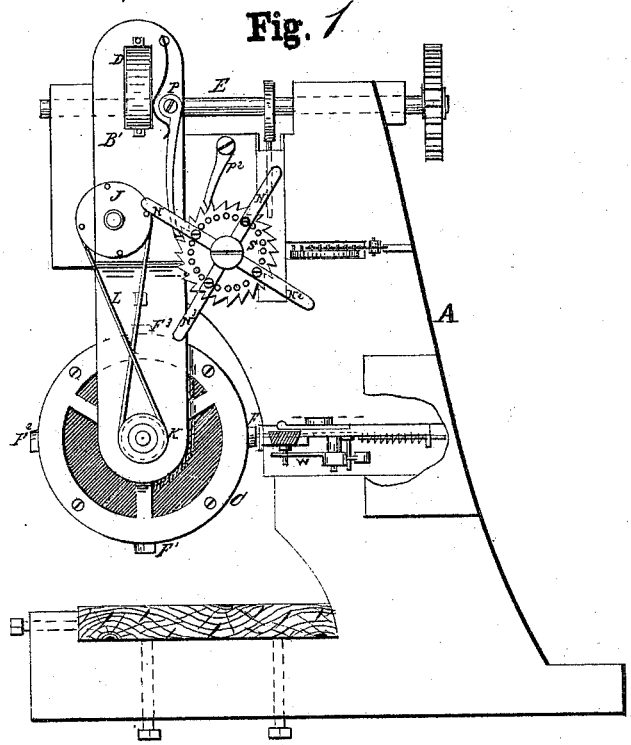

A. C. McKNIGHT.
Machines for Making Boot and Shoe Heels.
No. 140,060. Patented June 17, 1873.

5 Sheets--Sheet 1.

WITNESSES. Isaac Townsend
Isaac R. Oakford

Alexander C. McKnight
INVENTOR.

A. C. McKNIGHT.
Machines for Making Boot and Shoe Heels.
No. 140,060. Patented June 17, 1873.
5 Sheets--Sheet 2.
Fig. 5
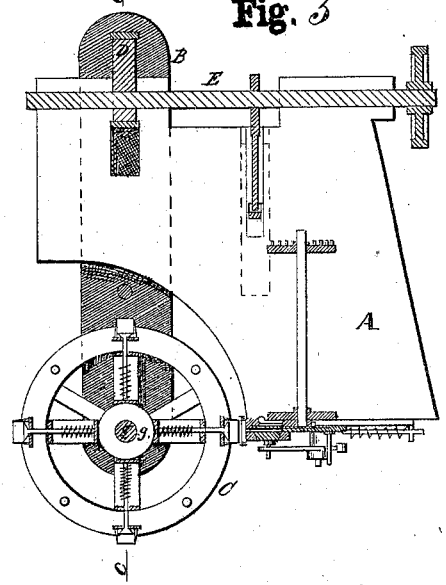
Fig. 6
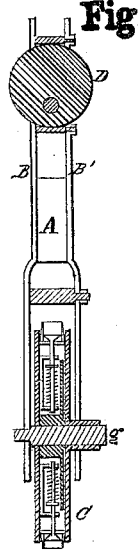
Fig. 7
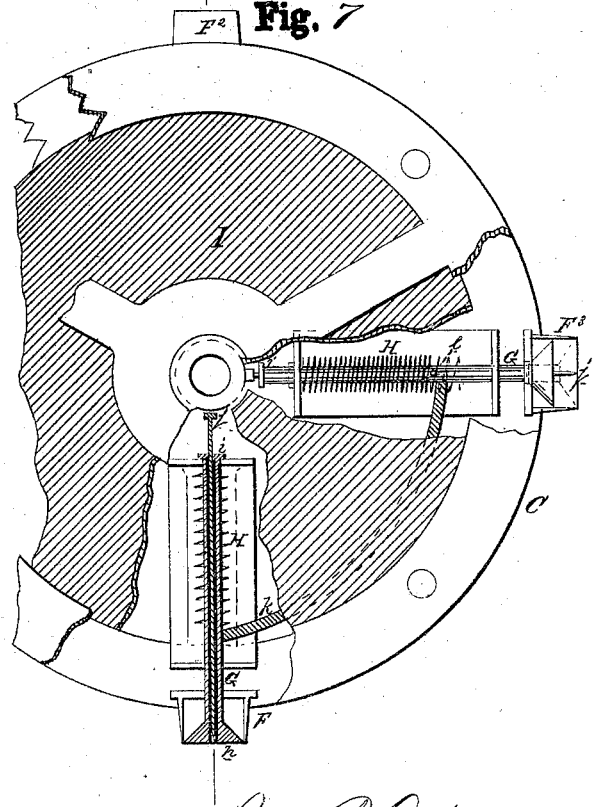
Fig. 8
Fig. 9
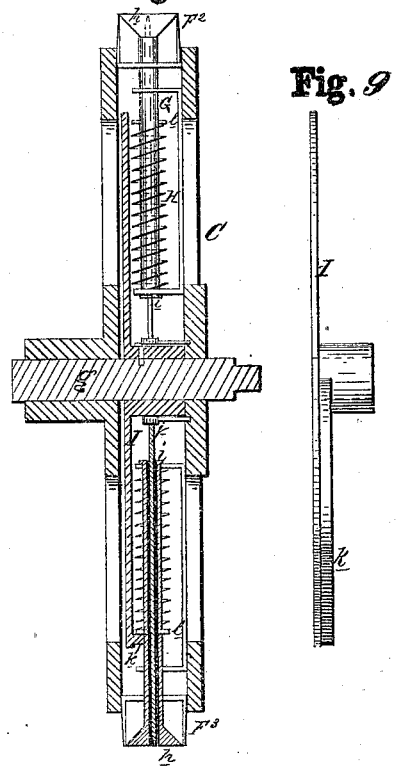
WITNESSES.
Isaac R. Oakford
Isaac Townsend
Alexander C. McKnight
INVENTOR.
AM. PHOTO-LITHOGRAPHIC CO. N.Y. (OSBORNE'S PROCESS.)

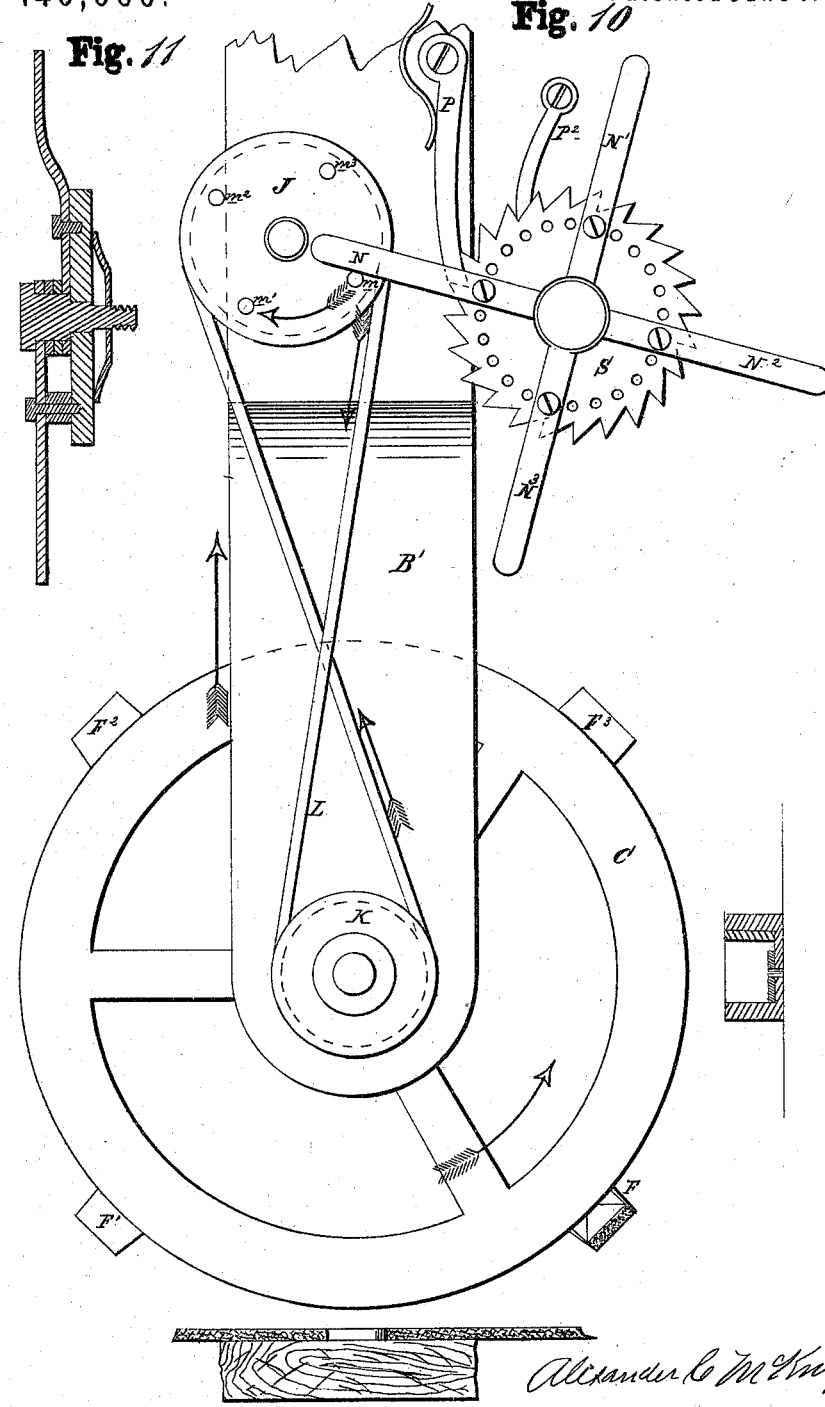

A. C. McKNIGHT.
Machines for Making Boot and Shoe Heels.
No. 140,060. Patented June 17, 1873.

5 Sheets--Sheet 4.

Alexander C. McKnight
INVENTOR.

WITNESSES.
Isaac Townsend
Isaac R. Oakford

AM. PHOTO-LITHOGRAPHIC CO. N.Y. (OSBORNE'S PROCESS.)

A. C. McKNIGHT.
Machines for Making Boot and Shoe Heels.
No. 140,060. Patented June 17, 1873.

5 Sheets--Sheet 5.

WITNESSES:

INVENTOR
Alexander C. McKnight

UNITED STATES PATENT OFFICE.

ALEXANDER C. McKNIGHT, OF PHILADELPHIA, PENNSYLVANIA.

IMPROVEMENT IN MACHINES FOR MAKING BOOT AND SHOE HEELS.

Specification forming part of Letters Patent No. 140,060, dated June 17, 1873; application filed November 13, 1872.

*To all whom it may concern:*

Be it known that I, ALEXANDER C. MC-KNIGHT, of the city and county of Philadelphia, and State of Pennsylvania, have invented certain Improvements in Machine for Making Boot and Shoe Heels, of which the following is a specification:

In the present manufacture of heel-blanks considerable labor is involved before they are ready for application to the sole of a boot or shoe, the operation of cutting out and removing each lift separately, and stacking them by hand previous to nailing them together, occupies time, and requires care and skill in arranging them systematically, in order that the pile may assume a shape as near as possible to the finished heel.

The operation of stacking and nailing the lifts together has been somewhat facilitated by the use of a machine especially adapted for the purpose, but in this, as in the hand process, considerable time is consumed, and additional labor is required.

In my invention the operations of cutting out, stacking, and securing the lifts together are all performed in one machine, so that the heel blanks, when delivered, are ready for the machine which finishes the nailing process.

The mechanism in my invention consists of a wheel or cylinder, provided on its periphery with any number of suitably-formed dies, and a receiver, in which the lifts are stacked; also a nail-driving apparatus, by which one or more nails are driven to secure the lifts temporarily together. The die-wheel or cylinder is arranged to receive both a vertical reciprocating and an intermittent rotary movement, by which means each lift is cut out and conveyed upward to the receiver, into which they are forced by means of a radial-moving plunger, working through the center of the dies. After the die-wheel has cut out and deposited the proper number of lifts for the heel-blank within the receiver, the nail-driving apparatus is set in motion, and drives a nail through the center of the pile, after which the blank is thrown out by a device operated from the wheel, all of which is more fully hereinafter described.

Figure 2:
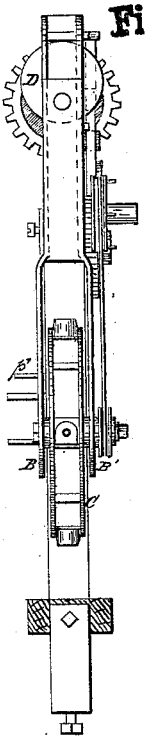
Figure 3:
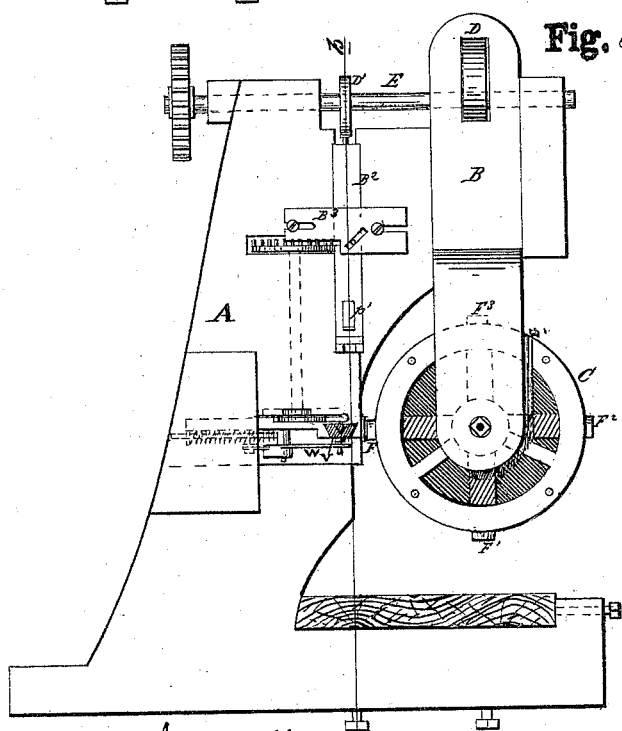
Figure 4:
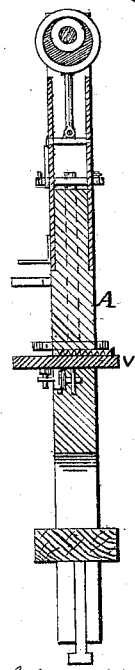
Figure 12:
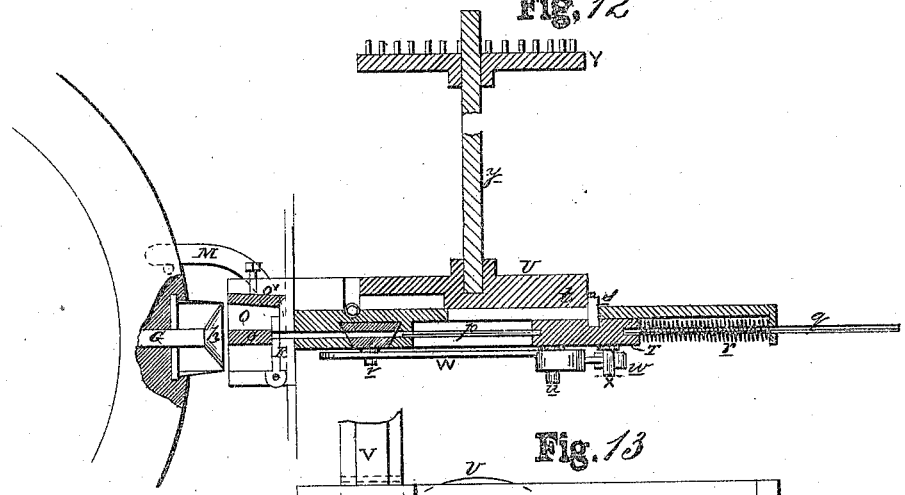
Figure 13:
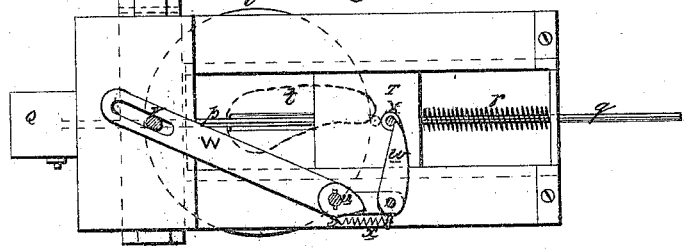
Figure 14:
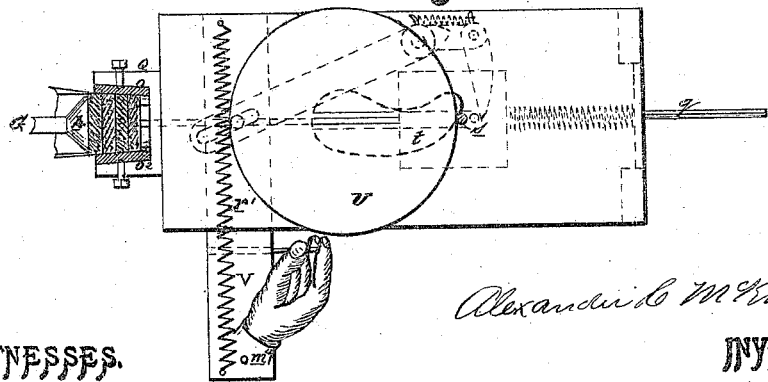
Figure 15:
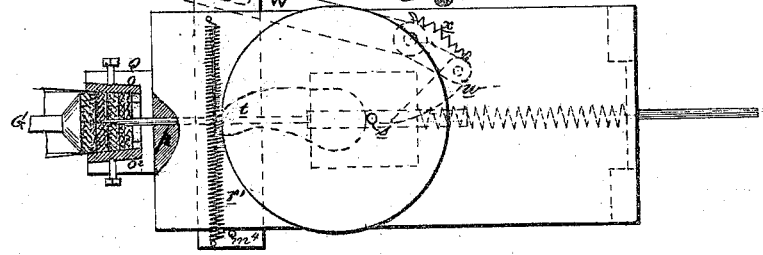
Figure 16:
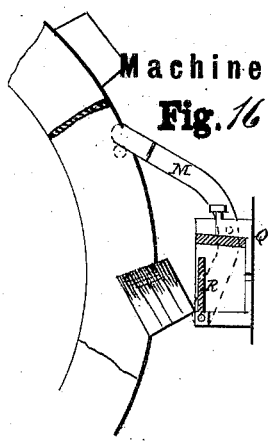
Figure 17:
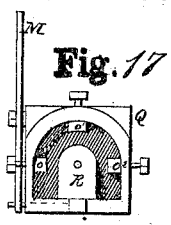
Figure 18:
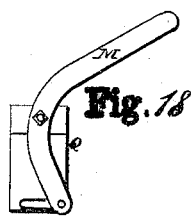
Figure 19:
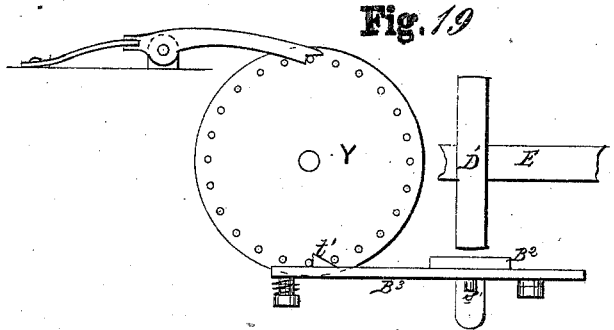
Figure 20:
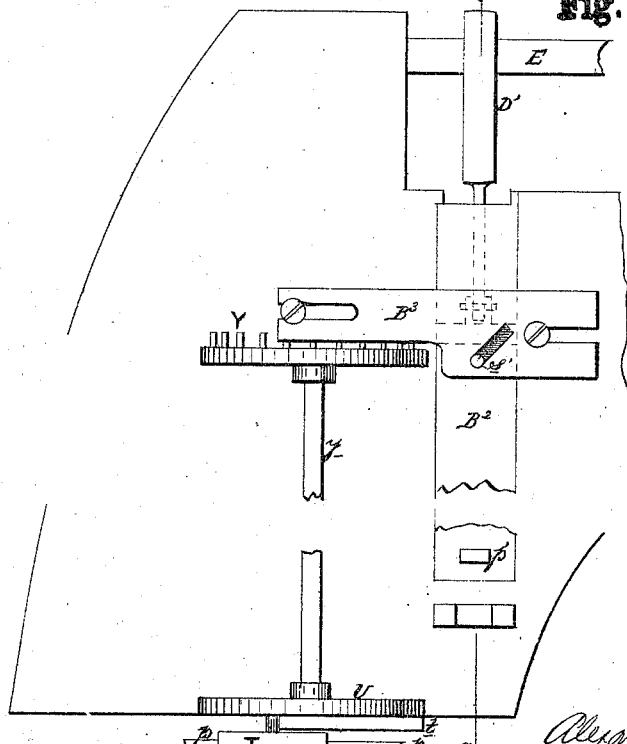
Figure 21:
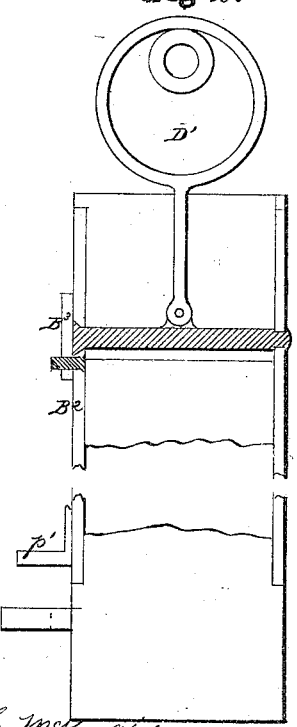

Fig. 1 is a side elevation of a machine embodying my invention. Fig. 2 is a front elevation of the same. Fig. 3 is a side elevation of the machine, reversed. Fig. 4 is a vertical section on line, $a\,b$, of Fig. 3. Fig. 5 is a vertical longitudinal section through the die-wheel and its attachments, the receiver, and nail-driving apparatus. Fig. 6 is a vertical section on line $c\,d$, of Fig. 5. Fig. 7 is a plan view (enlarged) of the die-wheel or cylinder, with portions broken away, in order to show more fully the arrangement of the dies. Fig. 8 is a vertical section through the center of the same. Fig. 9 is an edge view of a disk placed within the die-wheel or cylinder, and provided with a cam-guide for controlling the action of the plungers which force the lifts out of the dies. Fig. 10 is a side view of the die-wheel or cylinder and of the mechanism for producing a rotary movement. Fig. 11 is a vertical section through the center of the ratchet-wheel and arms. Fig. 12 is a vertical longitudinal section through the center of the nail-driving mechanism. Fig. 13 is a plan view of the under side of same. Fig. 14 is a plan view of the upper side of same, showing the position in which the nail is inserted previous to driving. Fig. 15 is a plan view of the same showing the position of the nail-driver after the nail has been driven into the pile. Fig. 16 is a vertical section of the receiver showing the curved arm and sliding plate as applied for discharging the heel-blank from the receiver. Fig. 17 is a front view of the same. Fig. 18 is a side view (reversed) of the same. Fig. 19 is a plan view of the mechanism employed for operating the nail-driving plate or slide, and also of a presser-foot, used in connection with a pricking-form. Fig. 20 is a side elevation of the same. Fig. 21 is a vertical section on line $e\,f$, of Fig. 20.

The frame A of the machine is made in any suitable form, and is supported upon a frame or feet of proper construction, working in suitable grooves or guides. In the side of it near the front end, are two parallel plates or bars B, and $B^1$, the lower ends of which have pivoted to them the die-wheel or cylinder C, a vertical reciprocating movement being imparted to them through an eccentric, D, placed upon the driving-shaft E.

The die-wheel or cylinder C is made in two sections, which are connected at a certain distance apart, and rotate upon a stud, $g$, see Figs. 5, 6, and 8. Secured in any suitable manner between the rims, and projecting out a proper distance beyond the periphery of the said wheel, is a series of four dies F, F$^1$, F$^2$, and F$^3$, each of which is provided with a plunger, G. Each plunger, Figs. 7 and 8, is made hollow, and is provided on the outer end with an enlargement or head, $h$, which fits loosely within the die and prevents the plunger from flying out by the expansion of the spiral spring H, with which they are provided.

The plungers G are arranged radially within the wheel, and passing axially through each is a rod, $j$, the inner end of which is secured to the wheel, and the outer extremity sharpened to a point and terminating on a line with the cutting-edge of the die, so as to punch the nail-hole as each lift is cut out.

A disk, I, Figs. 7, 8, and 9, provided on the inner side with a cam-guide, $k$, is placed stationary upon the stud $g$, between the sections of the wheel or cylinder. The said guide extends around one-quarter of the circle of the disk, and occupies an eccentric position, with the center of the wheel, as shown at Fig. 7.

The projecting pin $l$, which is secured to the plunger, and confines the spiral spring H, is brought in contact with and passes around the inside of the cam-guide $k$, as the die-wheel revolves, which gradually compresses the spring and draws the plunger inward, as the pin approaches the horizontal diameter of the wheel, at which point the cam is nearest to the center of the wheel.

The vertical sliding bar B$^1$, Fig. 10, carries a grooved pulley J, and on the hub of the die-wheel C is placed a second pulley, K. Over these pulleys an endless belt or chain, L, is passed. Projecting out from the side of the pulley J, are four studs $m, m^1, m^2,$ and $m^3$, which are brought alternately in contact (as the bar ascends) with the arms N, N$^1$, N$^2$, and N$^3$ of the ratchet-wheel S, producing a partial rotation of the pulleys, which is transmitted to the die wheel through the belt L and pulley K.

The ratchet-wheel S is pivoted to the side of the frame of the machine, and the arms N, N$^1$, N$^2$, and N$^3$, which are made single, are adjusted independent of each other by means of set-screws $n$, which screw into openings made in the face of the wheel. A partial rotation of the ratchet-wheel is effected, as the sliding bar B' descends, by means of a pawl, P, attached to the bar, which engages with the teeth of the wheel, thereby projecting the alternate arm toward the approaching stud on the pulley J, and in proper position for the stud to bear against while the bar makes the return or upward movement.

The receiver Q, (Figs. 12 to 18,) into which the lifts are deposited and stacked, is placed on the frame A, in the rear and on a line with the horizontal diameter of the die-wheel or cylinder, and is provided in the interior with a series of three adjusting-blocks, O, O$^1$, and O$^2$, arranged somewhat similar to a lathe-chuck, by which means it is regulated to receive a large or small heel blank. A plate, R, is placed within the receiver, in a vertical position, and receives a reciprocating movement by means of a curved arm M, actuated from the die-wheel or cylinder; the object of which is to discharge the heel-blank after all the lifts are temporarily united by the nail-driving mechanism.

The nail-driving mechanism, Figs. 12 to 15, is located in the rear and on a horizontal line with the receiver, and consists of a nail-driving slide or plate, T, in the front end of which is affixed a nail-driving rod or bar $p$, and at the opposite end is secured a rod, $q$, furnished with a spiral spring, $r$, and on the upper surface of the slide is fixed a vertical stud, $s$, against which the cam $t$ on the rotating disk U, bears.

Placed at right angles in front of the driving-slide T, and a short distance from the projecting end of the driving-rod $p$, is a nail carrying plate V, which has an opening made transversely through the center of it for the reception of the nail. The nail-carrying plate V is shifted by means of a spiral spring $r$, so as to bring the opening in it, on a line with the driving rod or bar $p$, and directly opposite to an opening made through the frame and center of the receiver, through which passage the nail is driven. The expansion of the spring and outward movement of the plate is effected, by means of a lever, W, pivoted at $u$, to the frame of the driving-slide, the long arm of which lever is provided on the end with a slot, through which the pin $v$ on the under side of the nail-plate passes, and the short arm is furnished with a flexible finger, $w$, which is held at right angles by means of a spiral spring, $x$. A stud, X, secured to and projecting from the lower side of the driving slide T, bears against the finger $w$ as the slide moves backwards, and causes the lever to vibrate and carry with it the nail-plate. The disk U, carrying the cam $t$, which moves the driving-slide backward and compresses the spring r, receives a rotary movement from a toothed or pin wheel, Y, applied to the end of an upright shaft, $y$.

A vertical plate or bar, B$^2$, Figures 19, 20, and 21, is placed in suitable guides on one side of the frame A, and is connected to and receives a vertical reciprocating movement from an eccentric, D', placed upon the driving-shaft E. The said plate or bar has secured to it a stud, $s'$, which works within an inclined slot formed in the plate B$^3$ and communicates a horizontal reciprocating movement to it.

The plate B$^3$ has a cam or projection, $t$, formed on one side of it, which engages with the teeth of the wheel Y and imparts a rotary movement to the wheel as the plate moves backward. On the lower end of the vertical bar B$^2$ is secured a presser-foot $p'$ which is used in connection with a pricking for punching the nail-holes in the heel-blank, preparatory to its being placed in the heeling machine.

The die-wheel or cylinder, constructed and operating as above described, is provided with a sufficient number of dies to cut out four separate lifts, although any number of dies may be applied according to the number of lifts required for various heights of heels.

In operating the machine, the leather is placed upon a block directly under the first or smallest die F, Fig. 10; the descending wheel forces the die into the leather to cut out the lift. The eccentric D now makes the return stroke and carries the bars B and B¹ and the die-wheel upward. The stud $m$, on the pulley J, coming in contact with one of the arms of the ratchet-wheel, (which is held stationary by means of the stop P²,) causes a partial rotation of the pulley, which motion is transmitted, in the direction shown by arrows, to the die-wheel or cylinder. The die-wheel continues to ascend and rotate until the die carrying the lift has reached a position directly opposite to the receiver, at which point the spring on the plunger G is released from the cam guide on the disk I, and, expanding, forces the plunger outward and projects the lift into the receiver, it resting against the vertical plate R. When the die is in this position, the eccentric has reached its highest elevation or throw, and the wheel ceases to rotate, owing to the arm having ceased to act upon the stud $m$ on the pulley. The bars B and B¹ and the die-wheel are now moved downward by the action of the eccentric, thereby forcing the second die F′, which has been carried around by the wheel into a vertical position, down into the leather. While the bar B¹ is descending, the pawl P is turning the ratchet-wheel M, so as to bring the arm N′ in contact with the stud $m^3$. The die-wheel or cylinder continues to die out and deposit the lifts within the receiver until a sufficient number are assembled to form a heel of the required height. While the cutting out and stacking operation is in progress, the cam on the rotating disk U is gradually pressing the driving-slide T backward, and at the same time causing the end of the lever W to move inward, thereby expanding the spring $r$, and projecting the nail-carrying plate V a sufficient distance beyond the side of the frame for the introduction of a nail, as shown at Fig. 14. After the nail is inserted, the stud X, on the driving-slide T, passes beyond the reach of the finger $w$; at the same instant the compression of the spring $r$ draws the nail-carrying plate inward until the nail is directly opposite to the nail-passage, and on a line with the driving-rod, the movement of the plate being arrested at this point by means of a stud, $m^4$, which bears against the side of the frame. The cam $t$ continues to press the driving-slide further backward, and the moment the last lift is deposited within the receiver, the cam has passed its extreme limit of throw and released the stud $s$ of the driving-slide, when the spring $r$ instantly expands and projects the slide and driving-rod forward with sufficient stress to drive the nail into and through the lifts, as shown in Fig. 15. The further movement of the die-wheel operates the curved arm M, and slides the vertical plate R forward to discharge the heel-blank, after which the plate is pressed gradually backward by the succeeding lifts as they are introduced into the receiver. The die-wheel or cylinder may be regulated to descend and cut out one or more lifts with the same die before they are conveyed to the receiver, by removing one or more arms from the ratchet-wheel; or the arms may be adjusted so as to permit the wheel to cut out one lift of one particular size and convey it to the receiver, and in the succeeding movement to make two or more descents before rotating to cut out with the next die in order two or more lifts.

The speed of the pin or toothed wheel Y may be regulated to move slow or fast by altering the position of the studs $s'$, thereby increasing or diminishing the throw of the bar B³. This change is required in order to produce a fast or slow movement of the nail-driving slide in nailing heels of various heights.

I do not wish to confine myself to the arrangement of the mechanism as specifically described, as it is obvious that the construction and arrangement of the parts may be modified without changing the essential elements of my invention; as, for instance, a single rod or plunger working within a suitable opening in the frame, and provided with a forked end for the reception of the die wheel or cylinder, and operated by a crank or eccentric, could be substituted for the sliding bars B and B¹.

The die wheel or cylinder may be cast in one piece, in a circular casing or box form, with a plate or flange secured against the open end; or it may consist of a circular hub provided with one or more arms, to which one or more cutting-dies may be attached.

The mechanism for driving the nail may be modified by substituting for the sliding plate B³ an arm or pawl provided with a slot, and arranged to operate in the teeth of an ordinary pinion or ratchet wheel.

What I claim as my invention is—

1. A wheel or cylinder provided on the circumference with a series of lift-cutting dies, as arranged, and operating so as to have imparted to it a vertical, reciprocating, and intermittent rotary motion, substantially as and for the purpose herein shown and described.

2. The combination, with the die-wheel or cylinder C, of the plates or bars B and B¹, eccentric D, shaft E, ratchet-wheel S, with its arms N, N¹, N², and N³, pawl P, stop P², pulleys J and K, and belt L, all arranged and operating substantially as and for the purpose herein shown and described.

3. In combination with the cutting-dies F, F¹, F², and F³ of the die-wheel or cylinder, the radially-moving plungers G, and springs H, or their equivalents, for forcing the lifts out of the dies, as herein shown and described.

4. The combination, with each die, of a pointed rod or awl, $j$, arranged and operating to punch a nail-hole simultaneous with the cutting of the lift, as herein shown and described.

5. The combination, with the plungers G, pins $l$, and springs H, of the disk I, provided with a cam-guide, $k$, for compressing the spring and producing a backward radial movement of the plungers, previous to discharging the lifts into the receiver, substantially as herein shown and described.

6. In combination with the mechanism for cutting the lifts of a receiver, Q, arranged to admit the lifts for the purpose of stacking or piling them together, substantially as herein shown and described.

7. The combination in the receiver Q of the adjustable blocks $o$, $o^1$, and $o^2$, operating to adapt it for various sizes of heel-blanks, substantially as herein shown and described.

8. The combination of the curved arm M, and sliding-plate R, with the receiver Q, arranged and operating in the manner and for the purpose substantially as herein shown and described.

9. The combination of the nail-carrying plate V, provided with a lever, W, and spring $r'$, with the nail-driving slide T, provided with the rods $p$ and $q$, and spring $r$, arranged and operating substantially as herein shown and described.

10. The combination of the nail-driving slide T, rods $p$ and $q$, spring $r$, studs X and $s$, cam $t$, disk U, upright shaft $y$, gear-wheel Y, sliding-plates $B^2$ and $B^3$, eccentric $D'$, and driving-shaft E, all arranged and operating substantially in the manner and for the purpose described.

11. In combination with the driving-slide T, the nail-carrying plate V, lever W, with its flexible finger or projection $w$, stud $v$, and spring $r$, all arranged and operating substantially in the manner and for the purpose described.

12. The combination of the vertical plate or bar $B^2$, presser-foot $p'$, eccentric D, and plate or bar $B^3$, arranged and operating in the manner and for the purpose herein shown and described.

13. The combination, in a machine for forming heels for boots and shoes, of a die-wheel cylinder, or its equivalent, having a vertical reciprocating and intermittent rotary movement imparted to it, a receiver in which the lifts are projected from the wheel and assembled, and a nail-driving mechanism for securing the lifts temporarily together.

ALEXANDER C. McKNIGHT.

Witnesses:
   ISAAC TOWNSEND,
   ISAAC R. OAKFORD.